United States Patent [19]

Jha et al.

[11] Patent Number: 5,187,141
[45] Date of Patent: Feb. 16, 1993

[54] PROCESS FOR THE MANUFACTURE OF ACTIVATED CARBON FROM COAL BY MILD GASIFICATION AND HYDROGENATION

[76] Inventors: Mahesh C. Jha, 7891 Everett Way, Arvada, Colo. 80005; Robert L. McCormick, 711 Concord Ave., Boulder, Colo. 80304

[21] Appl. No.: 571,794

[22] Filed: Aug. 24, 1990

[51] Int. Cl.$^5$ .................... C01B 31/10; B01J 20/20
[52] U.S. Cl. .................................. 502/432; 502/27; 502/53; 502/416; 502/430; 502/431
[58] Field of Search ............... 502/432, 431, 430, 418, 502/416, 53, 56; 423/460, 461

[56] References Cited

U.S. PATENT DOCUMENTS

| | | | |
|---|---|---|---|
| 1,001,222 | 8/1911 | Richter | 502/56 |
| 2,717,868 | 9/1955 | Gorin et al. | 423/461 |
| 3,714,336 | 1/1973 | Davis et al. | 502/53 |
| 4,921,831 | 5/1990 | Hakai et al. | 502/418 |

FOREIGN PATENT DOCUMENTS

| | | | |
|---|---|---|---|
| 3115485 | 11/1982 | Fed. Rep. of Germany | 502/430 |
| 49196 | 4/1976 | Japan | 502/53 |
| 84309 | 7/1989 | Japan | 502/416 |
| 374597 | 6/1932 | United Kingdom | 502/53 |

*Primary Examiner*—Paul E. Konopka

[57] ABSTRACT

A process is provided for forming activated carbon from coal in the particulate state. The coal is first dried at a temperature sufficiently high to effect removal of moisture therefrom but below the temperature at which contained volatile matter vaporizes. The dried coal is then heated to an elevated temperature in a substantially non-oxidizing atmosphere at substantially atmospheric pressure sufficient to volatilize and remove the contained volatile matter and produce a char thereof and the char thereafter subjected to hydrogenation at an elevated temperature and pressure for a time sufficient to form activated carbon characterized by a BET surface area of at least about 200 m$^2$/g and an iodine number of at least about 400.

3 Claims, 1 Drawing Sheet

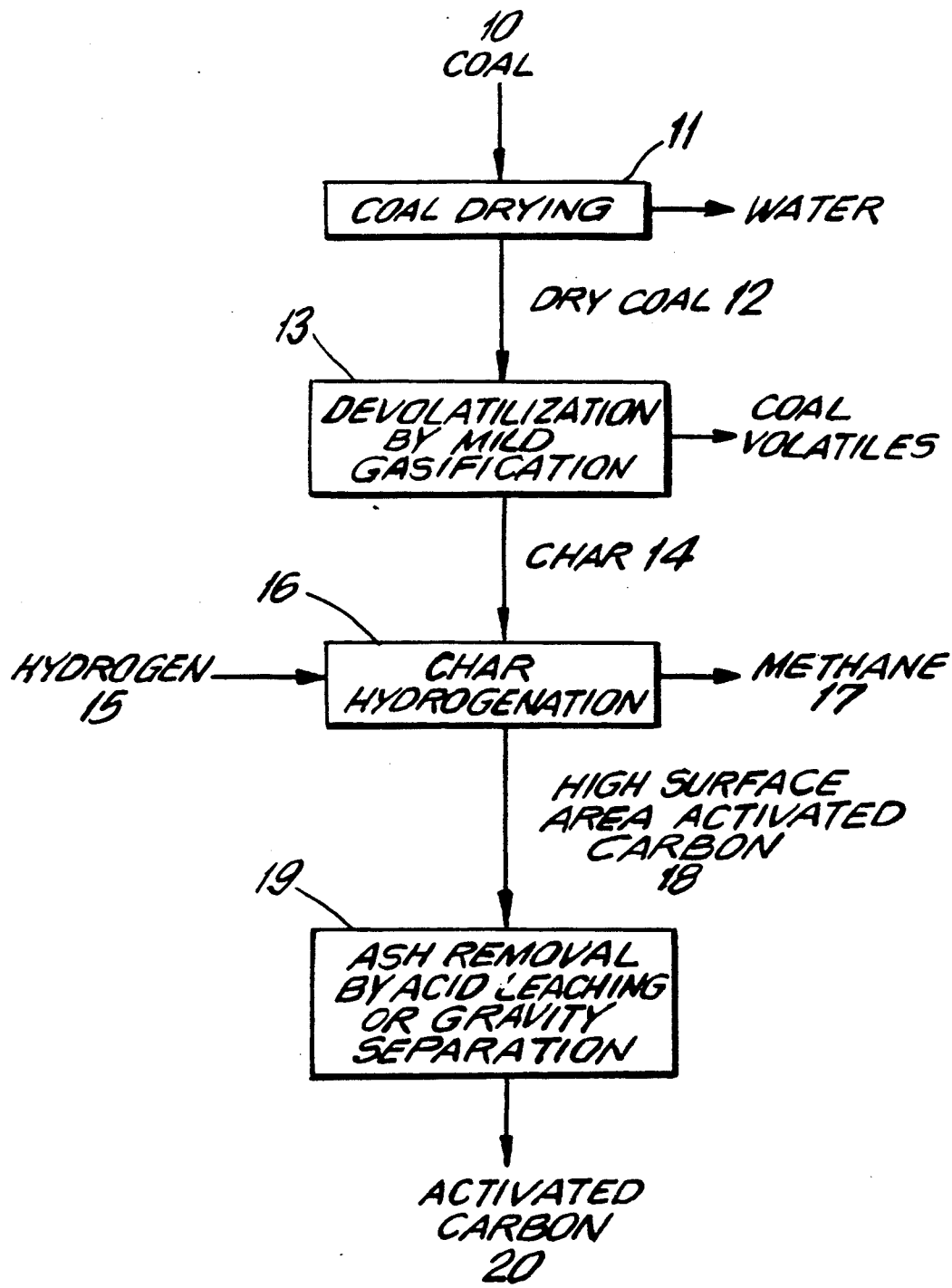

PROCESS FOR THE MANUFACTURE OF ACTIVATED CARBON FROM COAL BY MILD GASIFICATION AND HYDROGENATION

This invention relates to a process for producing activated carbon from coal and spent activated carbon.

BACKGROUND OF THE INVENTION

During World War I, it was discovered that lignite, bituminous, or anthracite coal served as an economical source of activated charcoal or carbon, if carefully carbonized and subjected to steam activation.

Activated carbon is a microcrystalline form of carbon with a large internal surface area. This large surface area allows the physical adsorption of large quantities of impurities from gases and liquids. Activated carbons are used extensively in water and food purification, metals recovery, production of high purity gases, and flue gas cleanup.

STATE OF THE ART

The basic properties of activated carbons are well known in the art and have been disclosed in, for example, the article by R. W. Soffel in Volume 4, page 561, of the publication Kirk-Othmer *Encyclopedia of Chemical Technology,* John Wiley and sons, New York, 1980. The pore structure of these materials is characterized by a large, accessible internal surface area. The specific surface area of activated carbons ranges from 300 to 2,500 $m^2g$, and the pore structure or pore size distribution is varied according to a particular application. The surface area measured by the BET method can vary considerably depending on measurement procedures, particularly the gas used (nitrogen or carbon dioxide). There is no standard ASTM procedure. As an alternative, industry uses the Iodine Number which is determined by ASTM method D 4607-86.

Activated carbons can be divided into two types based on the intended application in liquid phase or gas phase environments. Liquid phase carbons generally have a substantial fraction of surface area in pores larger than 3 nm. These relatively large pores are required to facilitate diffusion of the adsorbate species, which is dissolved in the liquid medium, into the internal pore space of the carbon. Gas phase carbons have all of their surface areas in pores smaller than 3 nm and have extremely high surface areas.

It is well known in the art that activated carbons are produced from agricultural by-products, wood, peat, coal, or virtually any other carbonaceous material. In general, these materials are first carbonized in the absence of oxygen at temperatures below 800° C. The carbonized product is then activated to have a high surface area. In the prior art, these materials are activated by oxidation with air, steam, or carbon dioxide in a high temperature environment or by reaction with chemical agents such as phosphoric acid, zinc chloride, and sulfuric acid at lower temperatures in the absence of air. During this treatment, volatile matter is removed and gasification reactions occur which lead to pore structure and surface area development. Exact procedures are closely guarded secrets and have not been discussed in the open literature. General principles of activated carbon production have been revealed in the book, *Activated Carbon,* by R. C. Bansal, J. B. Donnet, and F. Stoeckli, published by Marcel Dekker, New York, 1988.

A survey of the patent literature on the production of activated carbon from coal produced the references listed below:

| U.S. Pat. No. | Date | Inventor | Scope |
|---|---|---|---|
| 3,483,134 | 12/1969 | Olson | Binders and Air Activation |
| 3,536,589 | 10/1970 | Voet | Treatment to Reduce Swelling |
| 3,668,145 | 11/1970 | Belter | Production in Jet Engine |
| 3,876,505 | 4/1975 | Stoneburner | Drying and Partial Oxidation |
| 4,144,193 | 3/1979 | Murty | Acid Treatment |

These disclosures deal with methods for making activated carbon pellets and methods for activation in oxidizing environments. None of these disclosures discuss the effect of activation conditions on pore size or activated carbon properties. None of them describe activation in a reducing environment.

The major technical challenge in the manufacture of activated carbons is to produce a material with the desired pore size distribution and surface area. This is often difficult because of the highly endothermic or exothermic nature of the activation reactions which leads to the activation occurring under diffusion controlled conditions.

The present process overcomes these challenges by first producing a large pore, low surface area material from coal by mild gasification. The char is then activated to provide a high surface area by reaction with hydrogen. The activated carbon produced is suitable for a variety of liquid phase applications.

In this process, a coal char is produced by low temperature devolatilization or mild gasification of coal. The char is heated in a hydrogenation environment where much of the carbon in the char reacts to form methane. This procedure allows the development of a large surface area in the residual char. This material is then processed further to reduce ash content. The final product is an activated carbon with high surface area and wide pores which is suitable for use in several applications.

OBJECTS OF THE INVENTION

One object of the invention is to provide a process for the production of activated carbon with large pores and a high surface area Another object is to provide a process for the production of activated carbon from coal by devolatilization followed by hydrogenation. The combination of these operations produces the desired pore characteristics.

A further object is to produce activated carbon from spent activated carbon.

These and other objects will be explained more clearly from the following disclosure and the appended drawing which is a flow sheet illustrating each step of the process.

STATEMENT OF THE INVENTION

The invention is based on the principle that coal is comprised of several major constituents such as moisture, volatile matter, fixed carbon, and mineral matter which respond differently when coal is heated to high temperatures in various gas environments. In the present process, the moisture and volatile matter are removed selectively and sequentially under conditions which are optimum for that process step. This produces a low volatile matter char characterized by large pores.

In the case of spent activated carbon, the volatile matter would comprise absorbed material resulting from use.

The second principle of the present invention is that a substantial portion of the remaining fixed carbon in the char can be removed by hydrogenation, under kinetically controlled conditions, to thereby produce a high surface area material while leaving the large pores developed by devolatilization intact.

The third principle of the invention is the removal of ash from the char by physical or chemical means without altering the desired pore structural characteristics.

Thus, the invention is applicable to the treatment of carbonaceous material selected from the group consisting of coal and spent activated carbon.

Stating it broadly, the process of the invention comprises drying particulate coal or spent activated carbon by heating it to a temperature sufficiently high to effect removal of moisture therefrom but below that temperature at which contained volatile matter vaporizes. The heating is continued for a time sufficient to substantially eliminate the moisture therefrom.

Thereafter, the dried coal or dried spent activated carbon is heated to an elevated temperature in a substantially non-oxidizing atmosphere at about atmospheric pressure sufficient to volatilize and remove a substantial portion of volatile matter present and produce a char thereof. The char is then subjected to hydrogenation at an elevated temperature and pressure for a time sufficient to form activated carbon characterized by a BET surface area of at least about 200 m$^2$g, generally about 300 to 900 m$^2$/g and an iodine number of at least about 400 and generally 600 to 1200.

The drying of the carbonaceous material is preferably carried out at a temperature of about 100° C. to 300° C. and the volatile matter preferably removed at a temperature ranging from about 400° C. to 700° C.

The hydrogenation temperature ranges from about 700° C. to 900° C. at an elevated pressure of about 115 psia to 415 psia.

In a preferred embodiment, following hydrogenation, the activated carbon is subjected to ash removal by either leaching or gravity separation.

DETAILS OF THE INVENTION

The various steps in the process are shown in the accompanying conceptual flow diagram. The first step in the process for treating coal is drying the coal to remove most or all of the moisture before further processing. This is particularly important for low rank coals. The drying must be performed at temperatures high enough for fast removal of moisture but not high enough to remove the volatile matter which would contaminate the condensate with organic pollutants, e.g., 100° C. to 300° C.

The next constituent to be removed is the volatile matter. The amount present in the coal varies from 15 to 45 percent, depending upon the coal seam. Most of the volatile matter can be removed by heating of the coal in a non-oxidizing atmosphere. The temperature range of 400° to 700° C. is to be preferred. Spent activated carbon contains substantially less volatile matter.

A variety of reactor design and process configurations could be used in the above mentioned steps. These will in turn influence quality of the char material produced. A continuous fluidized-bed reactor is preferred because of uniform heating. Further, a very short gas residence time is preferred to eliminate secondary reactions of the volatile matter with the char, thereby producing a char with the desired pore structural characteristics.

The key step in the process is activation of the char using hydrogen in a high temperature, high pressure environment. This process step produces an increase in surface area of over an order of magnitude while preserving the large pores produced in devolatilization. Preferred conditions are in the range of 700° to 900° C. and 115 to 415 psia. The activated carbons produced have BET surface areas in the range of about 300 to 900 m$^2$/g and iodine number in the range of about 600 to 1200. This material is suitable for use in a variety of applications. If desired, a further process step can be performed to lower the ash content of the activated carbon. This has the effect of increasing the specific surface area by removing low surface area ash constituents from the product material. Ash can be preferentially removed by gravity separation or acid leaching. The acid leaching may have an added advantage in certain applications by lowering the pH of the activated carbon surface. The drawing shows a schematic diagram of the process. A subbituminous coal 10 is dried at 100° to 300° C. in a fluid-bed dryer. The fluidizing gas is carbon dioxide, air, or nitrogen, and a solids residence time of 2 to 10 minutes is used. The dried coal is then devolatilized in a second fluid-bed reactor 13 at a temperature of 400° to 700° C. and a 5 to 10-minute solids residence time. The fluidizing gas used is carbon dioxide or gas produced by coal pyrolysis. The char material 14 produced has properties in the range listed in Table 1.

TABLE 1

| Properties of Char | |
| --- | --- |
| Weight % Carbon | 75–82 |
| Weight % Hydrogen | 1–3 |
| Weight % Sulfur | 0.2–0.6 |
| Weight % Nitrogen | 0.5–1.5 |
| Weight % Oxygen | 7–12 |
| Weight % Ash | 8–12 |
| Weight % Volatile Matter | 11–18 |
| Weight % Fixed Carbon | 70–80 |
| Weight % Moisture | 0–0.1 |
| BET Surface Area, m$^2$/g | 30–60 |
| Pore Volume, cm$^3$/g | 0.1–0.3 |
| Mean Pore Diameter, nm | 100–400 |

The char material 14 is then reacted with hydrogen 15 at 700° to 800° C. and 100 to 300 psig (115 to 315 psia) in a fixed-bed reactor 16. Alternatively, a fluid-bed reactor could be employed. A solids residence time of 60 and 200 minutes is employed in the fixed-bed system. This reactor produces methane 17 and a high surface area material 18 with properties in the range listed in Table 2. This material can be utilized as an activated carbon or can be further upgraded to remove ash at 19 to produce activated carbon 20.

One preferred technique for ash removal is acid leaching. This is performed by mixing a solution of 10 to 25 volume percent HCl with 5 to 20 weight percent solids for 1 to 3 hours at 50° to 90° C. After this time, the activated carbon material is filtered and washed with large amounts of water. This procedure results in an activated carbon absorbent with the properties listed in Table 2.

TABLE 2

Properties of Activated Carbon
Produced by Hydrogenation of Char

| | |
|---|---|
| Weight % Carbon | 67–80 |
| Weight % Hydrogen | 0.5–1.0 |
| Weight % Sulfur | 0.4–1.2 |
| Weight % Nitrogen | 0.2–0.7 |
| Weight % Oxygen | 0.1–2.0 |
| Weight % Ash | 14–28 |
| BET Surface Area, $m^2/g$ | 300–800 |
| Pore Volume, $cm^3/g$ | 0.5–0.9 |
| Mean Pore Diameter, nm | 50–200 |
| Iodine Number | 600–900 |

TABLE 3

Properties of Acid Leached Activated Carbon

| | |
|---|---|
| Weight % Carbon | 80–90 |
| Weight % Hydrogen | 1–3 |
| Weight % Sulfur | 0.2–0.6 |
| Weight % Nitrogen | 0.2–0.7 |
| Weight % Oxygen | 0.1–1 |
| Weight % Ash | 4–8 |
| BET Surface Area, $m^2/g$ | 400–900 |
| Pore Volume, $cm^3/g$ | 0.6–1.0 |
| Mean Pore Diameter, nm | 50–200 |
| Bulk Density, $g/cm^3$ | 0.3–0.5 |
| Phenol Adsorption Capacity, mg/g | 100–300 |
| Iodine Number | 800–1,000 |

Another preferred technique for ash removal is gravity separation. One method for accomplishing this is through the use of a Wilfly table and aqueous media. The lightest 3 to 35 percent of the feed char is taken as the activated carbon product. Drying of this product produces an activated carbon with the properties shown in Table 4.

TABLE 4

Properties of Activated Carbon Upgraded by Tabling

| | |
|---|---|
| Weight % Carbon | 80–90 |
| Weight % Hydrogen | 1–3 |
| Weight % Sulfur | 0.2–0.6 |
| Weight % Nitrogen | 0.2–0.7 |
| Weight % Oxygen | 0.1–1 |
| Weight % Ash | 6–12 |
| BET Surface Area, $m^2/g$ | 600–900 |
| Pore Volume, $cm^3/g$ | 0.6–1.2 |
| Mean Pore Diameter, nm | 50–200 |
| Bulk Density, $g/cm^3$ | 0.2–0.5 |
| Phenol Adsorption Capacity, mg/g | 100–300 |
| Iodine Number | 800–1,000 |

EXAMPLES OF THE INVENTION

Example 1

A subbituminous coal produced at AMAX Coal's Eagle Butte Mine in the Powder River Basin of Wyoming was used. The coal was screened to have a mean particle diameter of 0.051 cm. The coal was dried to substantially zero percent moisture in an inclined fluid-bed reactor at a maximum bed temperature of 300° C. with carbon dioxide as the fluidizing gas and a 5-minute solids residence time. The dry coal was then mild gasified in a second inclined fluid-bed reactor with carbon dioxide as the fluidizing gas. An average bed temperature of 500° C. and a solids residence time of 5 minutes was used. The properties of the mild gasification char thus produced are listed in Table 5.

TABLE 5

Properties of Mild Gasification Char,
Activated Carbon, and Acid Leached Activated Carbon
(Examples 1 and 2)

| | Char | Activated Carbon | Acid Leached Carbon |
|---|---|---|---|
| Weight % Carbon | 78.0 | 73.9 | 87.7 |
| Weight % Hydrogen | 2.3 | 0.7 | 2.4 |
| Weight % Sulfur | 0.4 | 1.0 | 0.4 |
| Weight % Nitrogen | 1.2 | 0.2 | 0.3 |
| Weight % Oxygen | 9.0 | 1.9 | <0.01 |
| Weight % Ash | 9.0 | 22.8 | 7.2 |
| BET Surface Area, $m^2/g$ | 22 | 620 | 710 |
| Pore Volume, $cm^3/g$ | 0.2 | 0.69 | 0.98 |
| Mean Pore Diameter, nm | 100 | 50 | 30 |
| Bulk Density, $g/cm^3$ | 0.59 | 0.39 | 0.34 |
| Phenol Absorption Capacity, mg/g | — | — | 190 |
| Iodine Number | — | 730 | 880 |

The mild gasification char was activated with hydrogen in a 5 cm diameter fixed-bed reactor. The conditions used were 800° C., 285 psig (300 psia) and 4.0 SLM of hydrogen flow. The activation time was 2 hours. The activated carbon thus produced had the properties listed in Table 5. The activation procedure produces a large increase in BET surface area, iodine number, and pore volume for this activated carbon product.

EXAMPLE 2

The activated carbon product of Example 1 was acid leached to reduce the ash content. Acid leaching was performed using 15 volume percent HCl. Ten weight percent solids was leached in this acid solution for 1 hour at 80° C.. After this time the activated carbon was filtered and washed 5 times with 100 ml of water. The activated carbon was resuspended and the washing procedure was repeated. The resulting material was dried overnight at 105° C. The properties of the activated carbon product are shown in Table 5. Acid leaching resulted in a large decrease in ash content and a corresponding increase in carbon content, BET surface area, and iodine number.

The coal of Example 1 was screened to produce a feed coal with an average particle diameter of 0.084 cm. This material was dried to substantially zero percent moisture in an inclined fluid-bed reactor. A maximum temperature of 260° C., a 4-minute solids residence time, and carbon dioxide as the fluidizing gas were used. The dry coal was mild gasified in an inclined fluid-bed reactor operating at an average temperature of 520° C. A solids residence time of 5 minutes was used and the fluidizing gas was a recycle gas containing predominantly hydrogen, carbon monoxide, carbon dioxide, and methane. The properties of the mild gasification char thus produced are listed in Table 6.

TABLE 6

Properties of Mild Gasification Char,
Activated Carbon, and Gravity Separated Activated Carbon
(Examples 3 and 4)

| | Char | Activated Carbon | Gravity Separated Carbon |
|---|---|---|---|
| Weight % Carbon | 80.8 | 72.1 | 81.5 |
| Weight % Hydrogen | 0.9 | 0.8 | 1.0 |
| Weight % Sulfur | 0.6 | 1.4 | 0.7 |
| Weight % Nitrogen | 1.0 | 0.3 | 0.2 |
| Weight % Oxygen | 6.2 | — | 2.8 |
| Weight % Ash | 10.5 | 25.5 | 13.8 |
| BET Surface Area, $m^2/g$ | 20 | 590 | 800 |

TABLE 6-continued

Properties of Mild Gasification Char,
Activated Carbon, and Gravity Separated Activated Carbon
(Examples 3 and 4)

|  | Char | Activated Carbon | Gravity Separated Carbon |
|---|---|---|---|
| Pore Volume, cm$^3$/g | — | 0.74 | 1.17 |
| Mean Pore Diameter, nm | — | 20 | 30 |
| Bulk Density, g/cm$^3$ | 0.75 | 0.38 | 0.26 |
| Phenol Absorption Capacity mg/g | — | — | 250 |
| Iodine Number | — | 780 | 840 |

The mild gasification char was activated in hydrogen in a 5 cm diameter fixed-bed reactor. The conditions employed were 800° C., 285 psig (300 psia) and 4.0 SLM of hydrogen flow. The properties of the activated carbon thus produced are listed in Table 6. As in Example 1, a high surface area, high iodine number, activated carbon is produced.

EXAMPLE 4

The activated carbon of Example 3 was gravity separated using a Wilfly table and water. The lightest 3 weight percent of the sample was collected as the product. The properties of the activated carbon are also listed in Table 6. Gravity separation results in a marked reduction of ash content and an increase in surface area and iodine number.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process of forming activated carbon from coal in the particulate state which comprises:
   drying said coal at a temperature ranging from about 100° C. to 300° C. for a time sufficient to remove moisture therefrom,
   subjecting said dried coal to heating at an elevated temperature ranging from about 400° C. to about 700° C. for a time sufficient to remove a substantial portion of the volatile matter from said coal and produce a char therefrom, and
   then subjecting said char to hydrogenation at a temperature ranging from about 700° C. to about 900° C. at a pressure of about 115 psia to 415 psia for a time sufficient to form activated carbon characterized by a BET surface area of at least about 200 m$^2$/g and an iodine number of at least about 400.

2. The process of claim 1, wherein the activated carbon is produced with a BET surface area of about 300 to 900 m$^2$/g and an idoine number of about 600 to 1200.

3. The process of claim 1, wherein the char following hydrogenation is subjected to ash removal by employing either acid leaching or gravity separation.

* * * * *